United States Patent
Bengtson et al.

(10) Patent No.: US 6,366,666 B2
(45) Date of Patent: *Apr. 2, 2002

(54) ADJUSTMENT OF CALL SELECTION TO ACHIEVE TARGET VALUES FOR INTERVAL-BASED PERFORMANCE METRICS IN A CALL CENTER

(75) Inventors: David C. Bengtson; James E. Ertel, both of Aurora, CO (US); Robin H. Foster, Little Silver, NJ (US); Eugene P. Mathews, Barrington, IL (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,993

(22) Filed: Dec. 16, 1998

(51) Int. Cl.[7] ............................................. H04M 3/00
(52) U.S. Cl. ............................ 379/265.06; 379/266.08
(58) Field of Search ................................. 379/265, 266, 379/309

(56) References Cited

U.S. PATENT DOCUMENTS 6,163,607 A  * 12/2000  Bogart et al. ............... 379/209

* cited by examiner

*Primary Examiner*—Creighton Smith
(74) *Attorney, Agent, or Firm*—Ryan, Mason & Lewis, LLP

(57) ABSTRACT

A call selection process in a call center is controlled so as to ensure the achievement of target values for one or more interval-based performance metrics. In an illustrative embodiment, a memory in the call center is used to store information regarding contractual target values of one or more interval-based performance metrics such as, for example, an average speed of answering metric, or a percent in service level metric. The call selection process is then adjusted within a given performance interval based at least in part on a comparison of a value of the metric actually achieved during the interval to the corresponding stored target value. For example, a service objective of the call selection process may be adjusted at one or more designated points in the interval if the value of the metric actually achieved to a given one of the points will not allow achievement of the target value within the interval.

33 Claims, 3 Drawing Sheets

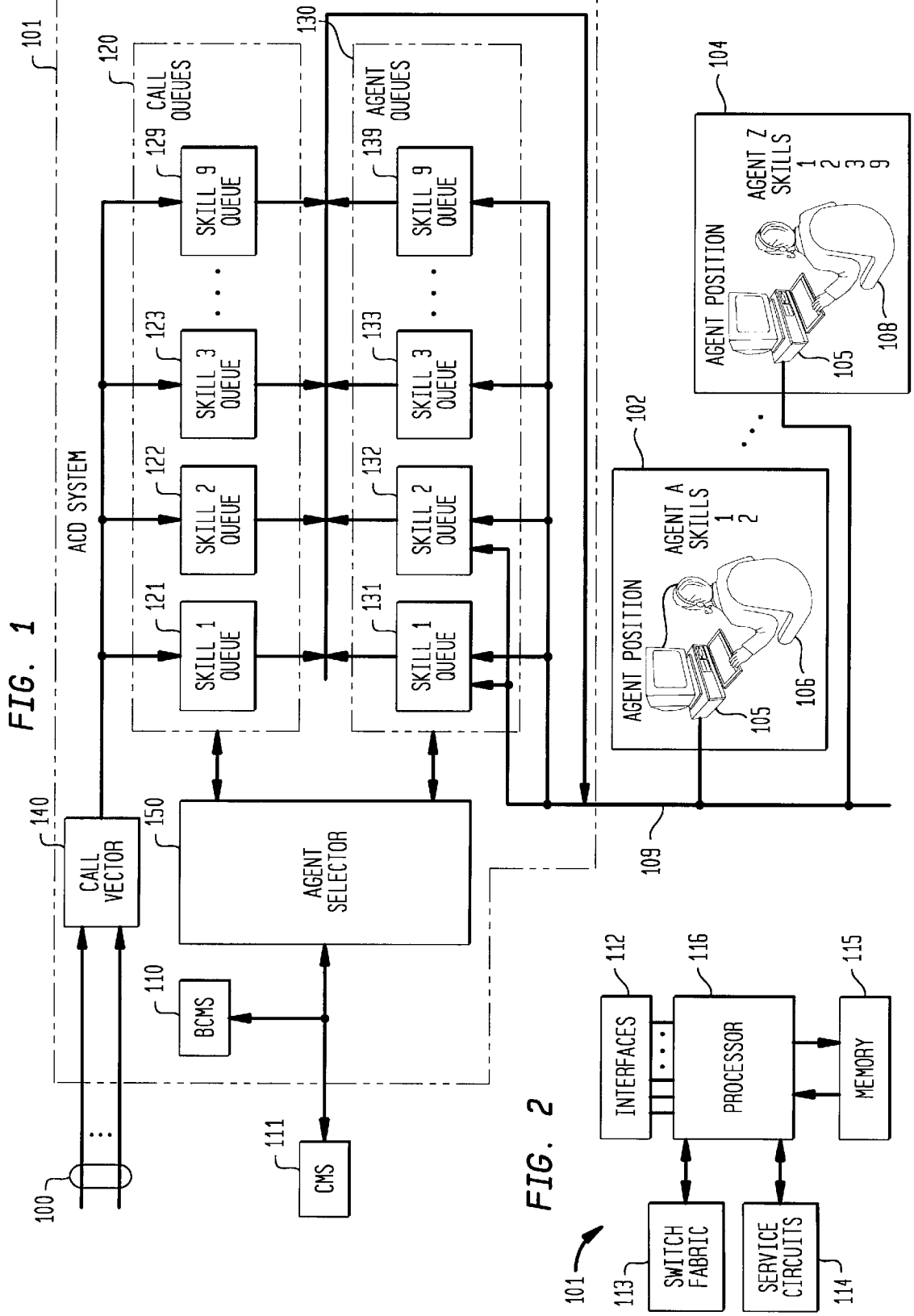

FIG. 4

| INTERVAL OBJECTIVE: ASA = 20 SECONDS | | | | | |
|---|---|---|---|---|---|
| ELAPSED TIME IN INTERVAL (MINUTES) | CURRENT SERVICE OBJECTIVE | NUMBER OF CALLS TAKEN SO FAR IN INTERVAL | ASA ACHIEVED SO FAR IN INTERVAL | NUMBER OF CALLS EXPECTED IN REMAINDER OF INTERVAL | NEW SERVICE OBJECTIVE |
| 1. 10 | 20 | 47 | 24 | 94 | 18 |
| 2. 20 | 18 | 90 | 21 | 45 | 18 |
| 3. 25 | 18 | 108 | 18 | 22 | 29 |
| 4. 30 (FINAL RESULTS) | 29 | 128 | 18 | 0 | |

EXPLANATION OF COMPUTATIONS

LINE 1:  NUMBER OF CALLS IN REMAINDER OF INTERVAL = (30-10 MIN) X (47 CALLS/10 MIN) = 94 CALLS
 ASA NEEDED FOR REMAINING 94 CALLS
  = [ (4.7 CALL/MIN X 30 MIN X 20 SEC/CALL) - (47 CALLS X 24 SEC/CALL) ]/94 CALLS
  = [2820 SEC - 1128 SEC]/94 CALLS
  = 18 SEC/CALL
 NEW SERVICE OBJECTIVE WILL BE SET TO 18 SEC

LINE 2:  NUMBER OF CALLS IN REMAINDER OF INTERVAL = 10 MIN X (90 CALLS/20 MIN) = 45 CALLS
 ASA NEEDED FOR REMAINING 45 CALLS
  = [ (4.5 CALL/MIN X 30 MIN X 20 SEC/CALL) - (90 CALLS X 21 SEC/CALL) ]/45 CALLS
  = [2700 SEC - 1890 SEC]/45 CALLS
  = 18 SEC/CALL

LINE 3:  NUMBER OF CALLS IN REMAINDER OF INTERVAL = 5 MIN X (180 CALLS/25 MIN) = 22 CALLS
 ASA NEEDED FOR REMAINING 22 CALLS
  = [ (4.32 CALL/MIN X 30 MIN X 20 SEC/CALL) - (108 CALLS X 18 SEC/CALL) ]/22 CALLS
  = [2592 SEC - 1944 SEC]/22 CALLS
  = 29 SEC/CALL

ADJUSTMENT OF CALL SELECTION TO ACHIEVE TARGET VALUES FOR INTERVAL-BASED PERFORMANCE METRICS IN A CALL CENTER

FIELD OF THE INVENTION

The invention relates generally to call centers or other call processing systems in which voice calls, e-mails, faxes, voice messages, text messages, Internet service requests or other types of communications are distributed among a number of service agents for handling.

BACKGROUND OF THE INVENTION

Call centers distribute calls and other types of communications to available call-handling service agents in accordance with various predetermined criteria. In existing call centers, the criteria for handling a call are often programmable by the operator of the call center via a capability known as call vectoring. Typically, when the call center detects that an agent has become available to handle a call, the call center identifies the call-handling skills of the agent, usually in some order of priority, and delivers to the agent the longest-waiting call that matches the agent's highest-priority skill. Most conventional call distribution techniques generally focus on being "fair" to callers and agents. This fairness is reflected by the standard first-in, first-out call to most-idle-agent call assignment process. The above-noted skills-based queuing improves upon this basic process in that it allows each agent to be placed into a number of different service categories based on the skill types supported by that agent.

Today, many call centers are run by businesses that operate as service bureaus, meaning that they handle calls on a contract basis for other companies. The contract generally governs how the service bureau must handle the calls, how the service bureau will be paid for achieving designated interval-based performance metrics, and the financial penalties the service bureau will incur if the performance metrics are not met. The designated performance metrics are generally "met" or "not met" based on some aggregate performance over a defined time interval, such as a half-hour or an hour. For example, the contract may specify an average speed of answer (ASA) of 30 seconds for calls of call type A within the defined interval, meaning that some callers can have longer waits, as long as within the interval the ASA is 30 seconds or less. As another example, the contract may specify a percentage in service level (PSL) stated as a percentage of calls which must be handled within a given time within the designated time interval, such as 80% of calls handled within 20 seconds in the designated interval.

Existing call centers, such as the DEFINITY® call center from Lucent Technologies, may include the capability of adjusting a call selection process such that calls are handled based on predicted wait time (PWT) as compared to a service objective (SO) for handling the calls. In a call center with this type of capability, each call is still generally considered individually, without regard to any aggregate performance statistics which may have already been accumulated within the current interval. In addition, service objectives are generally static and usually changed only through an administrative process. However, in a service bureau application, agents may handle multiple skills governed by different contractual agreements. A drawback of existing call centers is that such centers generally do not take into account, in the call selection process, how well the contractual targets for interval-based performance metrics are being achieved in the current interval, and the penalties associated with failing to achieve any of the contractual targets.

SUMMARY OF THE INVENTION

The invention provides call selection based on target values of interval-based performance metrics so as to ensure the achievement of the target values during a specified performance interval. In an illustrative embodiment, a memory in the call center is used to store information regarding contractual target values of one or more interval-based performance metrics. The interval-based performance metrics may be, for example, an average speed of answering metric, or a percent in service level metric. The call selection process is then adjusted within a given performance interval based at least in part on a comparison of a value of the metric actually achieved, during the time elapsed within the given interval, to the stored target value. For example, a service objective of the call selection process may be adjusted at a designated point in the interval if the value of the metric actually achieved to that point in the interval will not allow achievement of the target value within the interval, based on a prediction of the number of calls expected in the remainder of the interval. In addition, the call center may determine the penalties associated with missing contractual target values, and take these penalties into account in adjusting the call selection process. Other techniques may also be used to provide the adjustment of the call selection process, including, for example, adjusting overload thresholds which control when one or more reserve agents begin to take calls.

Advantageously, the invention allows a service bureau or other call center operator to meet all of the requirements of a given contract with minimal over-performance and minimal under-performance, thereby maximizing the profits realized on the contract. These and other features and advantages of the present invention will become more apparent from the accompanying drawings and the following detailed description.

BRIEF DESCRIPTION OF THE DRAWINGS

FIG. 1 is a block diagram of a call center that incorporates an illustrative embodiment of the invention.

FIG. 2 is a block diagram of the automatic call distribution (ACD) system implemented in the call center of FIG. 1.

FIG. 4 shows an example in which call selection is adjusted in accordance with the invention to achieve interval-based performance metrics.

DETAILED DESCRIPTION OF THE INVENTION

Figure 3:
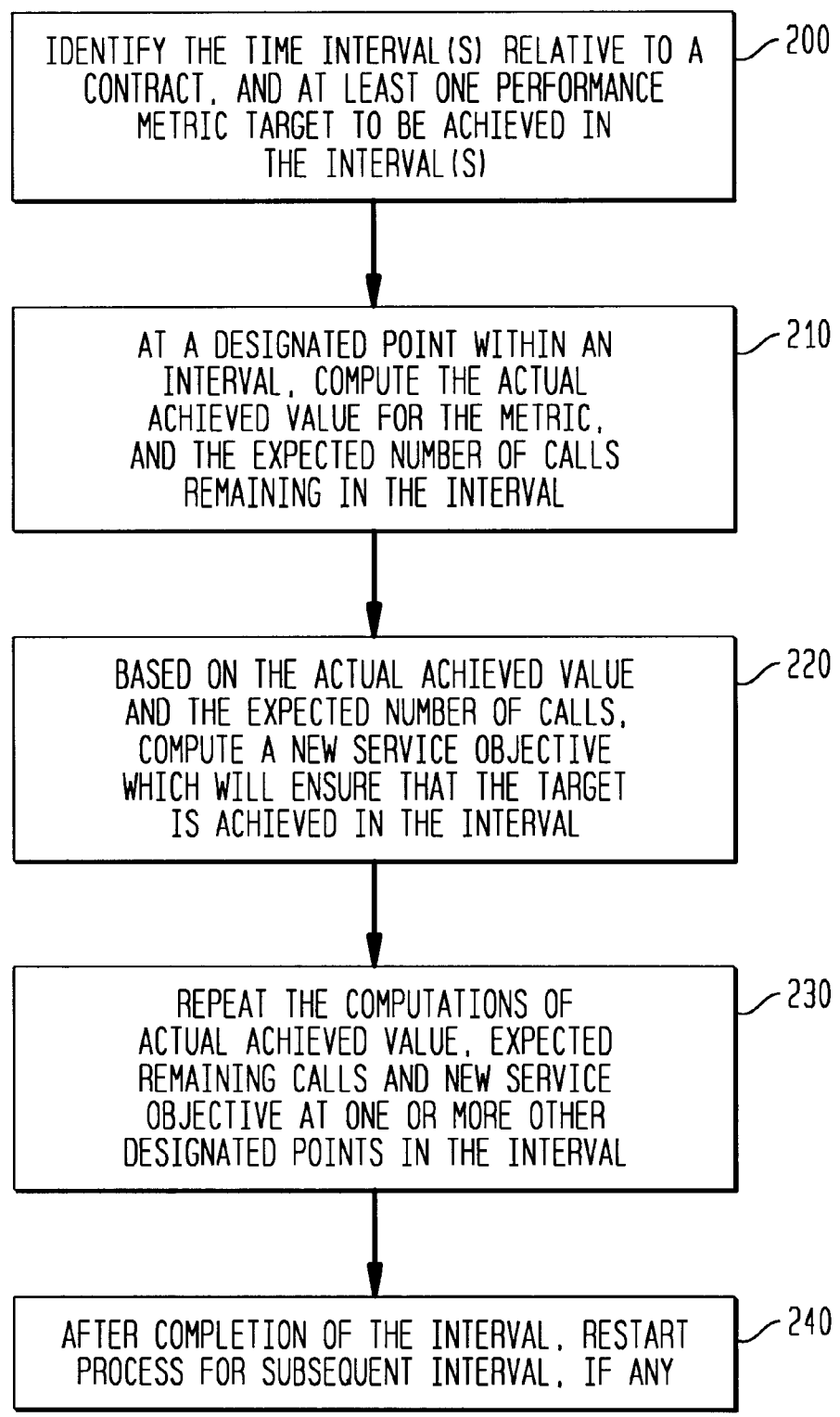
FIG. 3 is a flow diagram illustrating adjustment of call selection to achieve interval-based performance metrics in accordance with the invention.

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be can be used with automatic call distribution (ACD) systems, telemarketing systems, private-branch exchange (PBX) systems, computer-telephony integration (CTI)-based systems, as well as in combinations of these and other types of call centers. The term "call center" as used herein is thus intended to include any type of ACD system, telemarketing system or other communication system which processes calls or other service requests, including voice calls, video calls, multimedia calls, e-mail, faxes or voice messages as well as various combinations of these and other types of communications. The term "interval-based performance metric" as used herein is intended to include any measurement or other indicator which characterizes the performance of at least one function of a call center, for example, over a specified period of time. Examples of interval-based performance metrics include average speed of answer (ASA) and percentage in service level (PSL).

FIG. 1 shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

The ACD system 101 may be implemented in a manner similar to, for example, the Definity® PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric and to provide automatic call distribution functionality.

Referring again to FIG. 1, exemplary data elements stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels. Call vectoring is described in greater detail in Definity® Communications System Generic 3 Call Vectoring/Expert Agent Selection (EAS) Guide, AT&T Publication No. 555-230-520, Issue Nov. 3, 1993, which is incorporated by reference herein. Skills-based ACD techniques are described in greater detail in, for example, U.S. Pat. No. 5,206,903, which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system. Further details regarding call processing in a system such as ACD system 101 can be found in, for example, U.S. patent application Ser. No. 08/813,513 filed Mar. 7, 1997 and entitled "Waiting Call Selection Based on Anticipated Wait Times," and U.S. patent application Ser. No. 09/022,959 filed Feb. 12, 1998 and entitled "Call Center Agent Selection that Optimizes Call Wait Times," both of which are incorporated by reference herein.

In accordance with the invention, the call center of FIG. 1 includes a capability for adjusting a call selection process so as to achieve target values for interval-based performance metrics. The call selection process which is adjusted need not be of any particular type in order to benefit from the techniques of the invention. In one conventional call center, when a multi-skill agent becomes available, a "greatest need" type call selection process may select a call by examining the predicted wait times (PWTs) of the calls at the head of the queues for the skills that the multi-skill agent can handle, and then comparing the PWTs of the calls to a service objective (SO) identified for the skills. In an illustrative embodiment of the invention, for a service bureau that must meet a contractually-specified target for a performance metric such as an average speed of answering (ASA), the SO might initially be set at the ASA. A call with PWT/SO=1 would therefore have an actual ASA which corresponds exactly to the target ASA specified in the contract, while a call with PWT/SO>1 would drive the actual ASA above the specified target. As previously noted, in this and other conventional systems, service objectives are generally static and changed only through an administrative process.

The invention recognizes that it will often be desirable for a service bureau to get the ASA or other performance metric as close as possible to the contractual target without going over the target, i.e., over-performance, or missing the target, i.e., under-performance, rather than simply handling, e.g., the "greatest need" call at any particular moment. The above-noted "greatest need" call selection process is generally defined by the needs of a particular call relative to other calls. A service bureau may not want to select the call that has the greatest need, but instead may want to select the call that will make the most needed contribution to accomplishing the contractual targets for the interval-based performance metrics. This use of contractual performance criteria may in fact lead to a very different call selection decision than the conventional "greatest need" selection. For example, if the service level for a particular skill on the current interval has been poor, answering a number of calls very quickly may become very important. In order to allocate more resources to the skill for which meeting the performance target is in jeopardy, the acceptable service level can be periodically adjusted, as will be described in greater detail below.

FIG. 3 is a flow diagram showing the manner in which call selection can be implemented to ensure achievement of target values for interval-based performance metrics in accordance with the invention. It will be assumed without limitation that in the illustrative embodiment, one or more of the functions associated with the flow diagram are computed by processor 116 of ACD 101 operating in conjunction with memory 115 to execute appropriate stored program instructions. In step 200, the performance interval or intervals relative to a particular contract are identified, along with the performance metric targets to be achieved during the intervals. This may involve the determination of metric targets for more than one contract, and for a variety of different call types and skills. In addition, this step may include defining the penalty, in a common set of units, for missing each of the contractual targets, and defining under what condition(s) the penalties should be incorporated into decision making regarding adjustments in service objective.

Step 210 indicates that, at a designated point within a given performance interval, the actual achieved value is computed for the performance metric, as well as the expected number of calls remaining in the interval. The expected number of calls may be computed as, for example, the rate of calls per minute received so far in the interval times the remaining number of minutes in the interval, or a subtraction of the calls received so far from a forecast of the number of expected calls for the entire interval. In step 220, a new service objective is computed based on the actual achieved value and the expected remaining number of calls. The new service objective is one which is designed to ensure that the target for the performance metric will be achieved in the interval. In step 230, the computations of steps 210 and 220 are repeated at one or more other designated points in the interval. As shown in step 240, after completion of the current interval, the process may be restarted for another interval. Steps 210–230 may thus be repeated for each of a number of intervals for which performance metrics are to be monitored.

As an example, assume that a contractual ASA target for calls requiring a particular skill is 30 seconds for a 30 minute interval. If 20 minutes of the half-hour interval have elapsed, and the actual ASA is 35 seconds, there is only ⅓ of the remaining call volume left in which to pull the actual ASA back down to the 30 second target. If it is further assumed that the call volume for the half-hour interval is 100 calls, and that the number of calls taken up to this point is 67, the remaining 33 calls expected during the interval must have a combined ASA of just under 20 seconds in order to achieve the interval target of 30 seconds. Therefore, the acceptable service level for the skill could be readjusted by the system, e.g., to about 18 seconds, for the remainder of the interval. Similarly, if the actual ASA achieved on the first 67 calls in the first 20 minutes of the half-hour interval was 20 seconds, the remaining 33 calls expected in the interval could have an ASA of about 50 seconds without jeopardizing the ASA target for the overall interval.

This type of adjustment could also be made in an embodiment in which the contractual target is in terms of percentage in service level (PSL) metric, e.g., 80% of calls handled within 20 seconds. If the actual achieved value for the PSL metric part way through the interval would cause the target to be missed, the system could respond by performing at a level which exceeds the target PSL during the remainder of the interval. Similarly, if the actual PSL part way through the interval is far better than the contractual target for the interval, the system can perform at a level below the target PSL for the remainder of the interval. Other embodiments can monitor and adjust multiple performance metrics. For example, an embodiment could be configured which utilizes both ASA and PSL as performance metrics. In such a case, adjustments in call selection may be made to control one of the performance metrics even if the other is at an acceptable level.

At the start of each new performance interval, the service objectives and the actual values of the performance metrics could be re-initialized and the computation and adjustment process would begin again. The service objective could thus be adjusted periodically throughout a given interval. For example, if the interval is 30 minutes long, the service objective might be re-adjusted at designated points corresponding to 10 minutes, 20 minutes and 25 minutes into the interval. For a 60 minute interval, the service objective might be re-adjusted at 15, 30, 45, 50 and 55 minutes into the interval. The periods of adjustment may be fixed or variable. In one possible alternative implementation, adjustments may be made continually throughout the interval such as, for example, as each call is handled. Of course, numerous other adjustment periods, techniques and criteria could also be used. Additionally, as previously noted, the process of adjusting the service objective could be influenced by the penalty associated with missing one or more of the targets and by other factors such as the performance on other contracts. For example, if it is more important to achieve a given contractual target than it is to achieve one or more other contractual targets, the service objective may be biased toward achievement of the given contractual target at the expense of the others. Furthermore, an adjustment to call selection to achieve a contractual objective may be made by, for example, adjusting overload thresholds such that reserve agents are brought in earlier or later than they otherwise would be without the adjustment.

FIG. 4 shows a more detailed example illustrating the adjustment of service objective (SO) to achieve targets for interval-based performance metrics in an illustrative embodiment of the invention. In this example, the performance interval is 30 minutes, and the interval-based performance metric is ASA with a contractual target of 20 seconds. The example includes a table in which the first column shows the elapsed time in the interval, in minutes; the second column shows the current SO; the third column shows the number of calls taken so far in the interval; the fourth column shows the actual ASA achieved so far in the interval; the fifth column shows the number of calls expected in the remainder of the interval; and the sixth column shows the new SO, as adjusted in accordance with the techniques of the invention.

At an elapsed time of 10 minutes into the interval, the current SO is 20 seconds, i.e., equivalent to the target ASA, and 47 calls have been handled with an actual ASA of 24 seconds. The expected number of calls remaining in the interval is 94. A new SO is then computed, based on the actual ASA and the number of calls remaining in the interval, to ensure achievement of the target ASA. As shown in FIG. 4, this computation for line 1 of the table yields a new SO of 18 seconds. The SO is therefore adjusted downward to reflect the fact that the actual ASA is poorer than the 20 second target.

At an elapsed time of 20 minutes into the interval, the current SO is 18 seconds, i.e., the new SO computed for the previous line, and 90 calls have been handled with an actual ASA of 21 seconds. The expected number of calls remaining in the interval is 45. A new SO is again computed, in the manner shown in FIG. 4, again yielding an SO of 18 seconds. The SO remains adjusted downward because the actual ASA is still poorer than the 20 second target. At an elapsed time of 25 minutes into the interval, the current SO is 18 seconds, i.e., the SO computed for the previous line, and 108 calls have been handled with an actual ASA of 18 seconds. The expected number of calls remaining in the interval is 22. The new SO, computed as shown, reflects the fact that the actual ASA is now better than the target ASA. The new SO is therefore adjusted upward, to the computed value of 29 seconds. This value provides an actual ASA of 18 at the completion of the 30 second interval, which meets the contractual target for this performance metric.

Similarly, if the contractual interval-based performance metric is specified in terms of a percentage in service level (PSL), the actual PSL attained at various points throughout the interval is compared to the target and adjustments are made in the call selection service objective to bring about the achievement of the target. Advantageously, the invention allows a service bureau or other call center operator to meet all of the requirements of one or more contracts with both minimal over-performance and minimal under-performance, thereby maximizing the profits realized with any given contract or set of contracts.

Although the invention is particularly well-suited for use in call centers which operate as service bureaus, it can also be applied to call centers which only partially operate as a service bureau, i.e., which use the call center for their own operations as well as for operations of other companies, and to call centers which operate in a manner similar to service bureaus for various business units within a single company. In the latter case, agreements may be established with the business units to govern the level of service provided as an in-house resource to employees and/or as a resource to customers.

A call selection function in accordance with the invention may be implemented using one or more of the elements of the ACD system 101, such as, for example, the agent selector 150. More generally, the call processing to achieve target values for interval-based performance metrics may be implemented by processor 116 of FIG. 2 using program instructions and other information stored in the memory 115. In other embodiments of the invention, other elements of the FIG. 1 call center or any other type of call center may be used to provide call selection which ensures achievement of target values for interval-based performance metrics.

The above-described embodiments of the invention are intended to be illustrative only. For example, the invention does not require that the call arrival rate be uniform across a given interval. Suitable adjustments can be made to accommodate a wide variety of different call arrival conditions, as will be apparent to those skilled in the art. It should be noted that the exemplary configuration of the call center shown in FIG. 1 may be altered to incorporate a wide variety of different arrangements of components to provide the call selection functions described herein. In addition, as previously noted, the invention can be applied to a wide variety of communications other than calls, including faxes and e-mails. The contractual target information described above may be, for example, determined and implemented administratively, or through a computer-telephony integration (CTI) application. As another example, the invention can be implemented in an applications programming interface (API) with an existing call center software package.

Furthermore, it should be noted that the invention may be implemented in the form of a computer-readable medium or other similar medium containing software which, when executed by a computer or other type of processor, will cause the processor to implement the processing functions described above. For example, the BCMS 110, call vector 140, agent selector 150 and other elements of ACD system 101 may each be implemented at least in part as one or more software programs stored in memory 115 or any other computer readable medium associated with the ACD system 101, and executed by processor 116 or other processing hardware associated with the ACD system 101. A variety of other implementations may also be used to provide call selection in accordance with the invention. These and numerous other alternative embodiments within the scope of the following claims will be apparent to those skilled in the art.

What is claimed is:

1. A method of controlling a selection process for selecting communications for delivery to one of a plurality of agents in a call center, the method comprising the steps of:
    storing information regarding a target value of at least one interval-based performance metric for a specified interval, the interval-based performance metric being a multi-agent performance metric characterizing the aggregate performance of multiple agents of the call center in processing the communications; and
    adjusting the selection process at one or more points during the interval based at least in part for a given one of the points on a comparison of a value of the metric actually achieved at or prior to the given point in the interval to the stored target value.

2. The method of claim 1 wherein the at least one interval-based performance metric comprises at least one of an average speed of answering metric and a percent in service level metric.

3. The method of claim 1 wherein the adjusting step includes altering a service objective of the selection process at a designated point in the interval if the value of the metric actually achieved to that point in the interval will not allow achievement of the target value within the interval.

4. The method of claim 3 wherein the adjusting step includes altering a service objective of the selection process at a designated point in the interval if the value of the metric actually achieved to that point in the interval differs significantly from a target value of the metric for the interval.

5. The method of claim 1 wherein the adjusting step further includes the steps of determining a penalty for missing the stored target value, and adjusting the selection process based at least in part on the penalty.

6. The method of claim 1 wherein the adjusting step further includes a adjusting the selection process at a plurality of designated points during the interval based at least in part on a comparison of a value of the metric actually achieved at a given one of the plurality of points during the interval to the stored target value.

7. The method of claim 6 wherein the time between at least a subset of pairs of the designated points is variable.

8. The method of claim 7 wherein the time between the designated points decreases from an initial portion of the interval to a later portion of the interval.

9. The method of claim 6 wherein the time between each pair of the designated points is a predetermined constant.

10. The method of claim 1 further including the step of comparing the value of the metric actually achieved during the interval to the stored target value after each of a plurality of groups of one or more communications is processed.

11. The method of claim 1 wherein the adjusting step includes adjusting at least one overload threshold which controls when one or more reserve agents begin to take calls.

12. An apparatus for controlling a communication selection process in a call center, the apparatus comprising:

a memory for storing information regarding a target value of at least one interval-based performance metric for a specified interval, the interval-based performance metric being a multi-agent performance metric characterizing the aggregate performance of multiple agents of the call center in processing communications; and a processor coupled to the memory and operative to adjust the selection process at one or more points during the interval based at least in part for a given one of the points on a comparison of a value of the metric actually achieved at or prior to the given point in the interval to the stored target value.

13. The apparatus of claim 12 wherein the at least one interval-based performance metric comprises at least one of an average speed of answering metric and a percent in service level metric.

14. The apparatus of claim 12 wherein the processor is further operative to alter a service objective of the selection process at a designated point in the interval if the value of the metric actually achieved to that point in the interval will not allow achievement of the target value within the interval.

15. The apparatus of claim 14 wherein the processor is further operative to alter a service objective of the selection process at a designated point in the interval if the value of the metric actually achieved to that point in the interval differs significantly from a target value of the metric for the interval.

16. The apparatus of claim 12 wherein the processor is further operative to determine a penalty for missing the stored target value, and to adjust the selection process based at least in part on the penalty.

17. The apparatus of claim 12 wherein the processor is further operative to adjust the selection process at a plurality of designated points during the interval based at least in part on a comparison of a value of the metric actually achieved at a given one of the plurality of points during the interval to the stored target value.

18. The apparatus of claim 17 wherein the time between at least a subset of pairs of the designated points is variable.

19. The apparatus of claim 18 wherein the time between the designated points decreases from an initial portion of the interval to a later portion of the interval.

20. The apparatus of claim 17 wherein the time between each pair of the designated points is a predetermined constant.

21. The apparatus of claim 12 wherein the processor is further operative to compare the value of the metric actually achieved during the interval to the stored target value after each of a plurality of groups of one or more communications is processed.

22. The apparatus of claim 12 wherein the processor is further operative to alter at least one overload threshold which controls when one or more reserve agents begin to take calls.

23. An article of manufacture containing call center software which, when executed in a processor, causes the processor to perform the steps of:

storing information regarding a target value of at least one interval-based performance metric for a specified interval, the interval-based performance metric being a multi-agent performance metric characterizing the aggregate performance of multiple agents of the call center in processing communications; and adjusting a communication selection process at one or more points during the interval based at least in part for a given one of the points on a comparison of a value of the metric actually achieved at or prior to the given point in the interval to the stored target value.

24. A method of controlling a selection process for selecting communications for delivery to one of a plurality of agents in a call center, the method comprising the steps of:

storing information regarding a target value of at least one interval-based performance metric for a specified interval; and adjusting the selection process based at least in part on a comparison of a value of the metric actually achieved during the interval to the stored target value;

wherein the at least one interval-based performance metric comprises at least one of an average speed of answering metric and a percent in service level metric.

25. A method of controlling a selection process for selecting communications for delivery to one of a plurality of agents in a call center, the method comprising the steps of:

storing information regarding a target value of at least one interval-based performance metric for a specified interval; and adjusting the selection process based at least in part on a comparison of a value of the metric actually achieved during the interval to the stored target value;

wherein the adjusting step includes altering a service objective of the selection process at a designated point in the interval if the value of the metric actually achieved to that point in the interval will not allow achievement of the target value within the interval.

26. A method of controlling a selection process for selecting communications for delivery to one of a plurality of agents in a call center, the method comprising the steps of:

storing information regarding a target value of at least one interval-based performance metric for a specified interval; and adjusting the selection process based at least in part on a comparison of a value of the metric actually achieved during the interval to the stored target value;

wherein the adjusting step further includes the steps of determining a penalty for missing the stored target value, and adjusting the selection process based at least in part on the penalty.

27. A method of controlling a selection process for selecting communications for delivery to one of a plurality of agents in a call center, the method comprising the steps of:

storing information regarding a target value of at least one interval-based performance metric for a specified interval; and adjusting the selection process based at least in part on a comparison of a value of the metric actually achieved during the interval to the stored target value;

wherein the adjusting step further includes adjusting the selection process at a plurality of designated points during the interval based at least in part on a comparison of a value of the metric actually achieved at a given one of the plurality of points during the interval to the stored target value.

28. A method of controlling a selection process for selecting communications for delivery to one of a plurality of agents in a call center, the method comprising the steps of:

storing information regarding a target value of at least one interval-based performance metric for a specified interval; and adjusting the selection process based at least in part on a comparison of a value of the metric actually achieved during the interval to the stored target value;

wherein the adjusting step includes adjusting at least one overload threshold which controls when one or more reserve agents begin to take calls.

29. An apparatus for controlling a communication selection process in a call center, the apparatus comprising:

a memory for storing information regarding a target value of at least one interval-based performance metric for a specified interval; and a processor coupled to the memory and operative to adjust the selection process based at least in part on a comparison of a value of the metric actually achieved during the interval to the stored target value;

wherein the at least one interval-based performance metric comprises at least one of an average speed of answering metric and a percent in service level metric.

30. An apparatus for controlling a communication selection process in a call center, the apparatus comprising:

a memory for storing information regarding a target value of at least one interval-based performance metric for a specified interval; and a processor coupled to the memory and operative to adjust the selection process based at least in part on a comparison of a value of the metric actually achieved during the interval to the stored target value;

wherein the processor is further operative to alter a service objective of the selection process at a designated point in the interval if the value of the metric actually achieved to that point in the interval will not allow achievement of the target value within the interval.

31. An apparatus for controlling a communication selection process in a call center, the apparatus comprising:

a memory for storing information regarding a target value of at least one interval-based performance metric for a specified interval; and a processor coupled to the memory and operative to adjust the selection process based at least in part on a comparison of a value of the metric actually achieved during the interval to the stored target value;

wherein the processor is further operative to determine a penalty for missing the stored target value, and to adjust the selection process based at least in part on the penalty.

32. An apparatus for controlling a communication selection process in a call center, the apparatus comprising:

a memory for storing information regarding a target value of at least one interval-based performance metric for a specified interval; and a processor coupled to the memory and operative to adjust the selection process based at least in part on a comparison of a value of the metric actually achieved during the interval to the stored target value;

wherein the processor is further operative to adjust the selection process at a plurality of designated points during the interval based at least in part on a comparison of a value of the metric actually achieved at a given one of the plurality of points during the interval to the stored target value.

33. An apparatus for controlling a communication selection process in a call center, the apparatus comprising:

a memory for storing information regarding a target value of at least one interval-based performance metric for a specified interval; and a processor coupled to the memory and operative to adjust the selection process based at least in part on a comparison of a value of the metric actually achieved during the interval to the stored target value;

wherein the processor is further operative to alter at least one overload threshold which controls when one or more reserve agents begin to take calls.

* * * * *